(12) United States Patent
Jack et al.

(10) Patent No.: US 7,227,291 B2
(45) Date of Patent: Jun. 5, 2007

(54) STATOR FOR AN ELECTRICAL MACHINE

(75) Inventors: Alan Galloway Jack, Hexham (GB); Phillip George Dickinson, Harrogate (GB); Barrie Charles Mecrow, Whitley Bay (GB)

(73) Assignee: Cummins Generator Technologies Limited, Lincolnshire (GB)

( * ) Notice: Subject to any disclaimer, the term of this patent is extended or adjusted under 35 U.S.C. 154(b) by 352 days.

(21) Appl. No.: 10/297,686

(22) PCT Filed: Jun. 6, 2001

(86) PCT No.: PCT/GB01/02493

§ 371 (c)(1),
(2), (4) Date: Dec. 4, 2003

(87) PCT Pub. No.: WO01/95459

PCT Pub. Date: Dec. 13, 2001

(65) Prior Publication Data

US 2004/0074079 A1      Apr. 22, 2004

(30) Foreign Application Priority Data

Jun. 6, 2000   (GB) ................................ 0013604.4

(51) Int. Cl.
*H02K 1/14* (2006.01)
*H02K 1/18* (2006.01)
*H02K 15/02* (2006.01)

(52) U.S. Cl. .................... 310/259; 310/218; 29/596

(58) Field of Classification Search ............... 310/254, 310/259

See application file for complete search history.

(56) References Cited

U.S. PATENT DOCUMENTS

| 2,145,791 | A |   | 1/1939 | Gille |
|-----------|---|---|--------|-------|
| 2,715,690 | A | * | 8/1955 | Neuenschwander ......... 310/220 |
| 2,830,209 | A | * | 4/1958 | Fleckenstein ............... 310/216 |
| 2,993,136 | A | * | 7/1961 | Richer, Jr. et al. .......... 310/258 |
| 3,644,767 | A | * | 2/1972 | Kasargod et al. ........... 310/254 |
| 6,504,285 | B2| * | 1/2003 | Yun ........................... 310/261 |
| 6,787,958 | B1| * | 9/2004 | Walter ........................ 310/168 |

FOREIGN PATENT DOCUMENTS

EP           0 871 282 A      10/1998

(Continued)

*Primary Examiner*—Burton Mullins
(74) *Attorney, Agent, or Firm*—Hamre, Schumann, Mueller & Larson, PC

(57) ABSTRACT

A stator (50) for an electrical machine. A core of the stator (50) is made up of a series of connected segments (42), that are rotatable relative to one another during an assembly operation. Each segment (42) includes a radially outermost base portion (44) from which a respective integral pole piece (46) projects substantially inwardly to a pole piece tip. The tip includes a surface (49) that is arcuate and concentric with an axis of rotation of the machine. Each pole piece (46) projects in a non-radial direction and such that a semi-closed slot (48) arranged to locate part of a least one coil (30) therein is provided between each pair of juxtaposed pole pieces (46). A coil (30) is fittable to a respective one of the pole pieces (46) during the assembly operation without deformation of the pole piece (46).

14 Claims, 4 Drawing Sheets

FOREIGN PATENT DOCUMENTS

| | | |
|---|---|---|
| EP | 0 881 755 A | 12/1998 |
| FR | 1 353 298 A | 5/1964 |
| JP | 09 308143 A | 11/1997 |
| JP | 11 341748 A | 12/1999 |
| JP | 2002176737 * | 6/2002 |

* cited by examiner

STATOR FOR AN ELECTRICAL MACHINE

The present invention relates to stators for electrical machines.

Electrical machines such as motors, dynamos or alternators generally include a stator having a laminated metal core with a number of coils supported thereon in an annular arrangement. A rotor, also with coils supported thereon, is commonly positioned within the annulus and mounted for rotation therein. The rotor and stator are separated by a small, annular air gap.

Stator constructions are known in which electromagnetic coils are wound in situ in slots in the stator core, or are forced into the slots through mouths of the slots. Such slots tend to have a narrow mouth formed in a radially inner surface of the stator core that leads to a larger cavity. Frequently the slots resemble "tear-drop" shapes in cross-section and are referred to as "semi-closed" slots due to the narrow mouths. As is known, a narrow mouth of each slot is advantageous in maximising flux in the air gap, in reducing "cogging" and in improving the quality of the sine wave output of alternators.

However, inserting conductors of stator coils into semi-closed slots is difficult.

This is a problem in itself, but also results in the proportion of slot space occupied by conductors of the coils being fairly small (typically 35%). Air occupies the remainder of the slots and acts as an insulant that hinders cooling of the conductors.

EP-A-0871282 discloses a further stator arrangement that is shown in FIG. 1. This stator includes an annular stator core 12 formed by stacking a number of steel sheets on top of each other. Each steel sheet includes a plurality of unit cores 13, each of which includes a unit yoke 14 and a magnetic pole tooth 15. The unit cores 13 are sequentially connected together by connecting portions 13a. Each magnetic pole tooth 15 includes a stator coil 18 thereon. The coils are held in position by means of protrusions 16 at the end of each pole tooth 15 furthermost from the respective yoke 14. The protrusions 18 are plastically deformable to provide an end stop to located the coil 18 on the respective tooth 15.

The stator disclosed in EP-A-0871282 has several disadvantages associated therewith. Firstly, plastic deformation of the protrusions 16 alters the electromagnetic properties of the electrical steel of the protrusions 16, leading to reduced permeability thereof and greater iron losses. In addition, plastic deformation causes the protrusions 16 to tend to lack concentricity with the axis of rotation, leading to an undesirably large and irregular air gap between the protrusions 16 and an adjacent rotor. This increases the reluctance of the air gap and reduces the performance of the machine.

It is an object of this invention to address one or more of these disadvantages.

According to an aspect of this invention there is provided a method of manufacturing a stator for an electrical machine, the method including the steps of:

a) selecting a plurality of core segments which are interconnected to form a strip, each core segment including a substantially arcuate base portion which has a convex side, a concave side and a pair of ends and a pole piece which projects from the concave side and from between the ends of the base portion, at least one of the ends of each core segment being connected to an end of an adjacent core segment and each pole piece having a tip which forms an arcuate surface;

b) fitting a respective pre-wound coil to at least one of the pole pieces; and c) forming said strip of core segments with said at least one core fitted thereon into an annular stator such that the arcuate surfaces at the pole piece tips are substantially concentric, characterised in that each pole projects from the concave side of the substantially arcuate base portion in a non-radial direction and a semi-closed slot is formed between it and an adjacent one of the pole pieces whereby said at least one coil is located between the respective pole piece and the adjacent pole piece.

According to another aspect of this invention there is provided a component for forming into an annular stator core of an electrical machine, the component being a plurality of core segments interconnected to form a strip, each core segment including a substantially arcuate base portion which has a convex side, a concave side and a pair of ends and a pole piece which projects from the concave side and from between the ends of the base portion, at least one of the ends of each core segment being connected to an end of an adjacent core segment and each pole piece having a tip that forms an arcuate surface, wherein each pole piece is adapted to receive at least one coil thereon and said strip of core segments is adapted to be formed, subsequent to receiving at least one coil on a respective one of the pole pieces, into an annular stator core, wherein the arcuate surfaces formed by the pole pieces are substantially concentric, characterised in that each pole piece projects from the concave side of the base portion in a non-radial direction and is arranged such that a semi-closed slot is formed between it and an adjacent one of the pole pieces whereby, when said at least one coil is fitted onto the respective pole piece and said strip of core segments is formed into the annular stator core, said at least one coil is located between the respective pole piece and the adjacent pole piece.

Preferably each pole piece projects in a direction that is substantially oblique to a radius therethrough.

Preferably, the perpendicular distance between sides of each pole piece is the same or smaller towards the respective tip than towards the respective base portion, thereby allowing a coil to be moved over the tip of the pole piece and to be fitted in position around the respective pole piece. Preferably inner surfaces of the coil are in mating contact with the sides of the respective pole piece, when the pole piece is fitted thereon. Preferably the perpendicular distance between the sides of each pole piece is constant for the length of each pole piece along which the respective coil is moved during fitting. The sides of each pole piece may be arcuate, and preferably are concentric arcs, for the length of each pole piece along which the respective coil is moved during placement. Preferably the arcs curve away from a radius through a root of the respective pole piece, the root being adjacent the respective base portion.

The sides of the pole piece may be: straight, parallel sides; straight sides that converge as they project from the base portion; or arcuate sides, the perpendicular distance between which reduces as they project from the base portion.

It will be appreciated that providing a pole piece that projects other than radially and for which the perpendicular distance between the sides is constant for the length of each pole piece along which the respective coil is moved during placement results in the arcuate surface at the tip of that pole piece being of greater curved length than would be the case if the pole piece projected radially with the same perpendicular distance between the sides of the pole piece. This is advantageous in reducing the gap between juxtaposed pole piece tips, while maintaining a cavity between the respective pole pieces to accommodate coil portions, i.e. in optimising the shape of the semi-closed slots.

Each segment of the component is rotatable relative to the other segments thereof from an assembly position in which the segments lie in a substantially linear series to an operational position in which the segments form the annular stator core.

Preferably each base portion of each segment is attached to a base portion of at least one other segment by a thin strip of integral material adjacent a radially outermost surface of each base portion.

Preferably, each coil is a pre-formed coil, such as a pre-wound "bobbin" of wire turns. Each coil may be mounted on a carrier. Preferably the shape of each coil is such that when it fitted to the respective pole piece and the strip of core segments is formed into the stator, the cavities are substantially filled thereby.

The strip of core segments may include a plurality of stacked laminations. The strip of segments may include a respective coil on every other pole piece.

Specific embodiments of this invention are now described by way of example only and with reference to the accompanying, drawings, in which.

Figure 1:
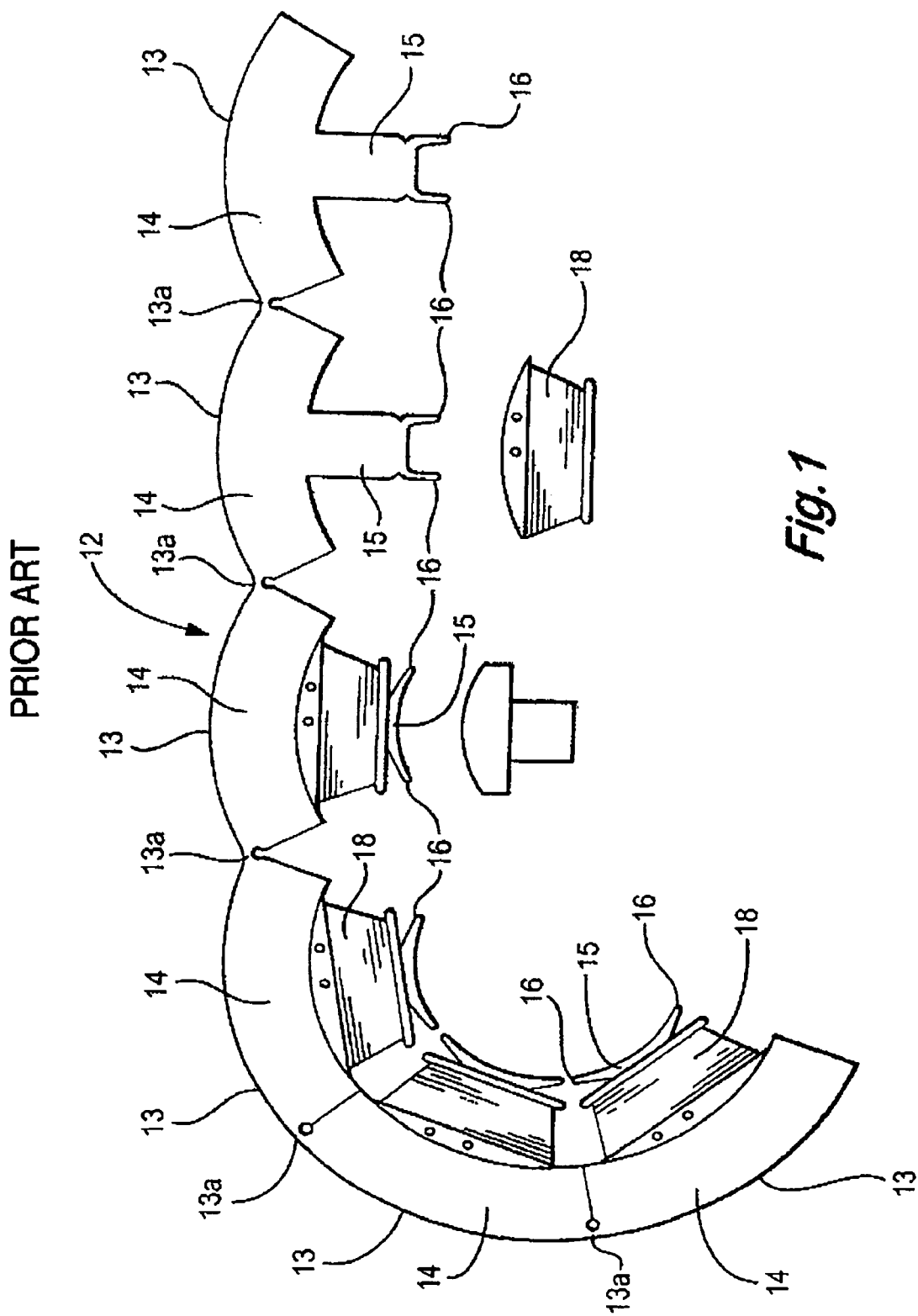
FIG. 1 is a plan view of a known stator.
Figure 2:
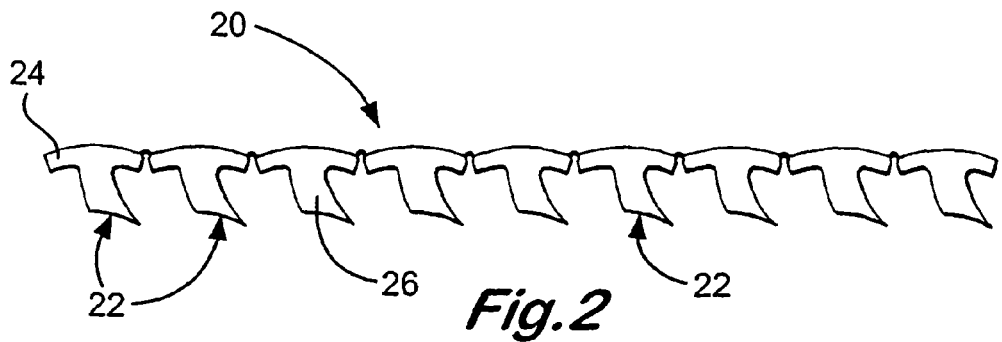
FIG. 2 is a plan view of a lamination for one stator in which the invention is embodied.

FIG. 2 shows a lamination 20 for use in manufacturing a stator of an electrical machine (not shown). It is envisaged that the electrical machine may be an AC or DC motor or generator. The lamination 20 is a thin strip of electrical steel that is stamped from a sheet of such steel (not shown). In an as-stamped arrangement, the lamination 20 includes a linear series of segments 22. In this embodiment there are nine such segments 22, but it is envisaged that any number of segments 22 may be used. Each segment 22 includes a base portion 24 that is substantially arcuate and an integral pole piece 26 that projects from a radially inner edge of the base portion 24. Each segment 22 is joined to each of two respective juxtaposed segments 22, apart from the two segments 22 at each end of the series which are each joined to only one respective segment 22. Juxtaposed segments 22 are joined by an integral, thin strip of material 27 between the respective base portions 24, adjacent a radially outer edge of the base portions 24.

Figure 3:
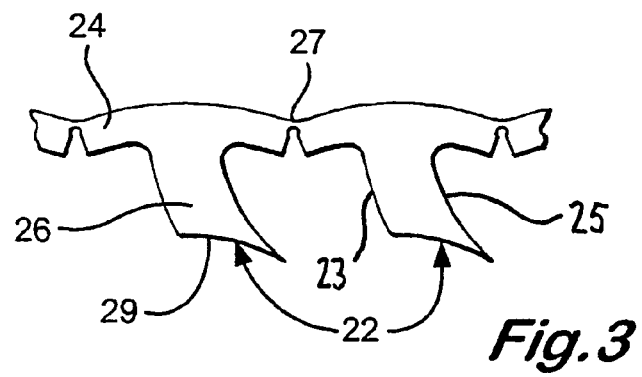
FIG. 3 is a plan view of a part of the lamination.

For simplicity of description, a representative one of the segments 22 will now be considered, with reference to FIG. 3. As stated, the pole piece 26 projects from the radially inner edge of the base portion 24. However, the pole piece 26 projects in a direction other than along a radius of the arcuate base portion 24. In this respect, the segment 22 resembles an eccentric T-shape, with the base portion 24 of the segment corresponding to the horizontal line of the "T" and the pole piece 26 corresponding to the vertical line of the "T", albeit displaced to one or other side of the vertical. The pole piece 26 has a first and a second side 23,25 running the length of the pole piece 26 in the direction of projection thereof. In this embodiment the two sides 23,25 are arcuate and concentric.

The pole piece 26 has a tip that is remote from the base portion 24. The tip includes an arcuate surface 29 that is concentric with the arcuate base portion 24.

In an assembly operation, a plurality of the laminations 20 are placed on top of each other to form a stack of constant cross section, the cross section being the same as the plan form of each lamination 20. A part of the stack 40 is depicted end-on in FIG. 4. The number of laminations 20 is that which is required to achieve the desired axial length of the stator of the electrical machine, the height of the stack 40 corresponding to the axial length of the stator. The laminations 20 may be fixed relative to one another by a fixing operation such as gluing or welding.

When stacked, the segments 22 of each laminate 20 go to make up nine elongate segments 42 of the stack 40. The pole pieces 26 of each segment 22 go to make up nine elongate pole pieces 46 of the stack 40. Similarly the base portions 24 of each segment go to make up nine elongate base portions 44 of the stack 40.

Figure 4:
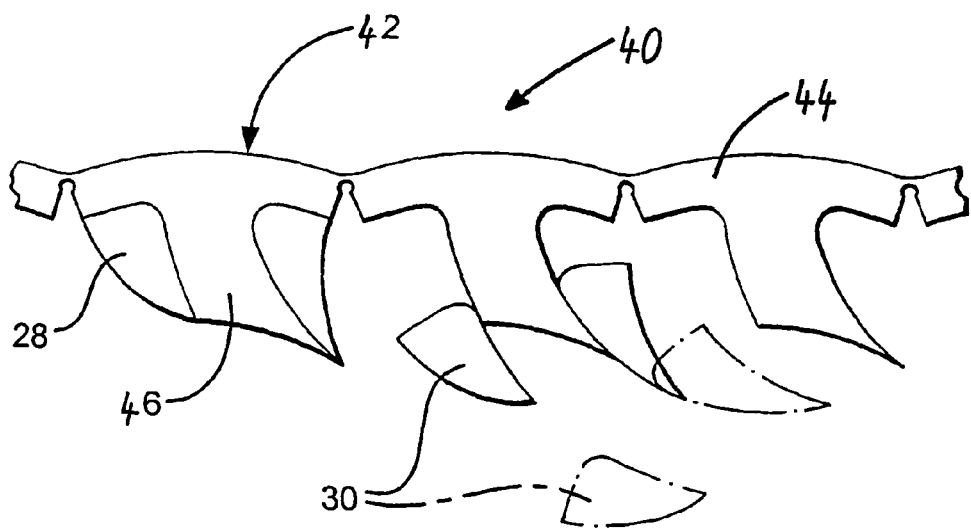
FIG. 4 is a plan view of another part of the lamination and two coils.

Each elongate pole piece 46 is adapted to have a respective coil fitted therearound. Each coil is a pre-wound bobbin of predetermined shape and is for use as a stator winding in the electrical machine. Two such coils 28,30 that are representative of all the coils are shown in FIG. 4 in cross section, the section being co-planar with the laminations 20. In cross section, each coil 28,30 consists of two spaced apart coil portions, each coil portion having an inside surface that is opposite the other coil portion. A first one of the coils 28 is shown fitted in place around a first one of the elongate pole pieces 46 of the stack 40. The inside surfaces of the coils 28,30 are such that each inside surface mirrors a respective one of the sides 23,25 of each pole piece 46, i.e. each inside surface is a co-axial arc. Thus when the coils 28,30 are in a fitted position, as is the first coil 28 in FIG. 4, the inside surfaces are a close, mating fit against the sides 23,25 of the elongate pole piece 46.

FIG. 4 also shows a second one of the coils 30 being fitted to a second one of the elongate pole pieces 46. As the sides 23,25 of the pole piece, and the inside surfaces of the coil 30 are concentric, the coil 30 can be fitted by being slid into the fitted position along the sides 23,25 of elongate pole piece 46. FIG. 4 shows the coil 30 at two instants during the fitting thereof to the elongate pole piece 46. A respective coil is fitted to each of the elongate pole pieces 46 of the stack 40 in this way.

As stated, in this embodiment the two sides 23,25 are arcuate and concentric. However, it is envisaged that the sides 23,25 may be: straight, parallel sides, straight sides that converge as they project from the respective base portion 24; or arcuate sides, the perpendicular distance between which reduces as they project from the base portion 24. Almost any relationship between the sides may be used, provided that the resulting geometry permits the fitting of a coil to the respective pole piece 26. However, it is desirable, for electromagnetic reasons, for the inside surfaces of the coil to closely fit the sides 23,25 of the pole piece 26 when the pole piece 26 is in the fitted position. For this reason, parallel sides 23,25 that diverge as they project from the base portion 24; and arcuate sides, the perpendicular distance between which increases as they project from the base portion 24, are not favoured.

Figure 5:
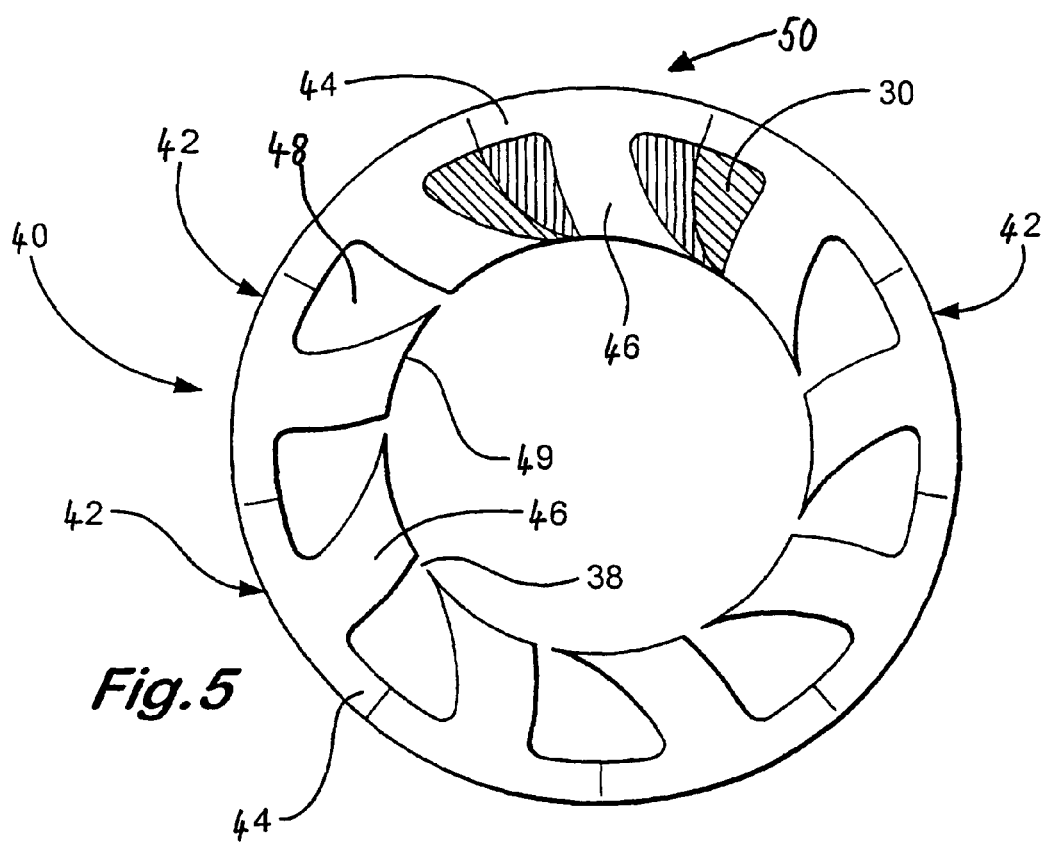
FIG. 5 is an axial view of the one stator.

Following fitting of the coils to the elongate pole pieces 46, each elongate segment 42 of the stack 40 is rotated relative to each other elongate segment 42 such that the stack 40 closes up to form an annular stator 50. The annular stator 50 is shown in FIG. 5. The annular stator 50 is adapted to receive a rotor (not shown) therein centred on an axis of rotation that is concentric with the arcuate surface 49 of the tip of each pole piece 46 and preferably with the arcuate base portion 44 of each segment 42. The stack 40 may be fixed in this closed-up position by a further fixing operation such as gluing or welding.

In the closed-up arrangement, the stator 50 includes nine elongate pole pieces 46, each with a radially innermost elongate surface 49 that is arcuate and concentric with the axis of rotation of the electrical machine. Concentricity of the elongate surfaces 49 is advantageous in providing a uniform annular air gap between the stator and the rotor.

There is a small gap 38 between juxtaposed elongate surfaces 49. Each small gap 38 leads to a respective larger cavity 48 in body of the stator 50. Together each gap 38 and the respective cavity 48 constitute a semi-closed slot and are therefore electromagnetically advantageous. Each cavity 48 is substantially filled by a coil portion of each of two coils.

From FIG. 5 it is evident that, by projecting in a non-radial direction, each pole piece 46 is able to include at the tip thereof, an arcuate surface 49 that is of greater length than that which would result if each pole piece 46 projected radially. The provision of arcuate sides 23,25, for each pole piece 46, in preference to straight sides, is advantageous in increasing the cross-sectional area or each cavity 48.

Figure 6:
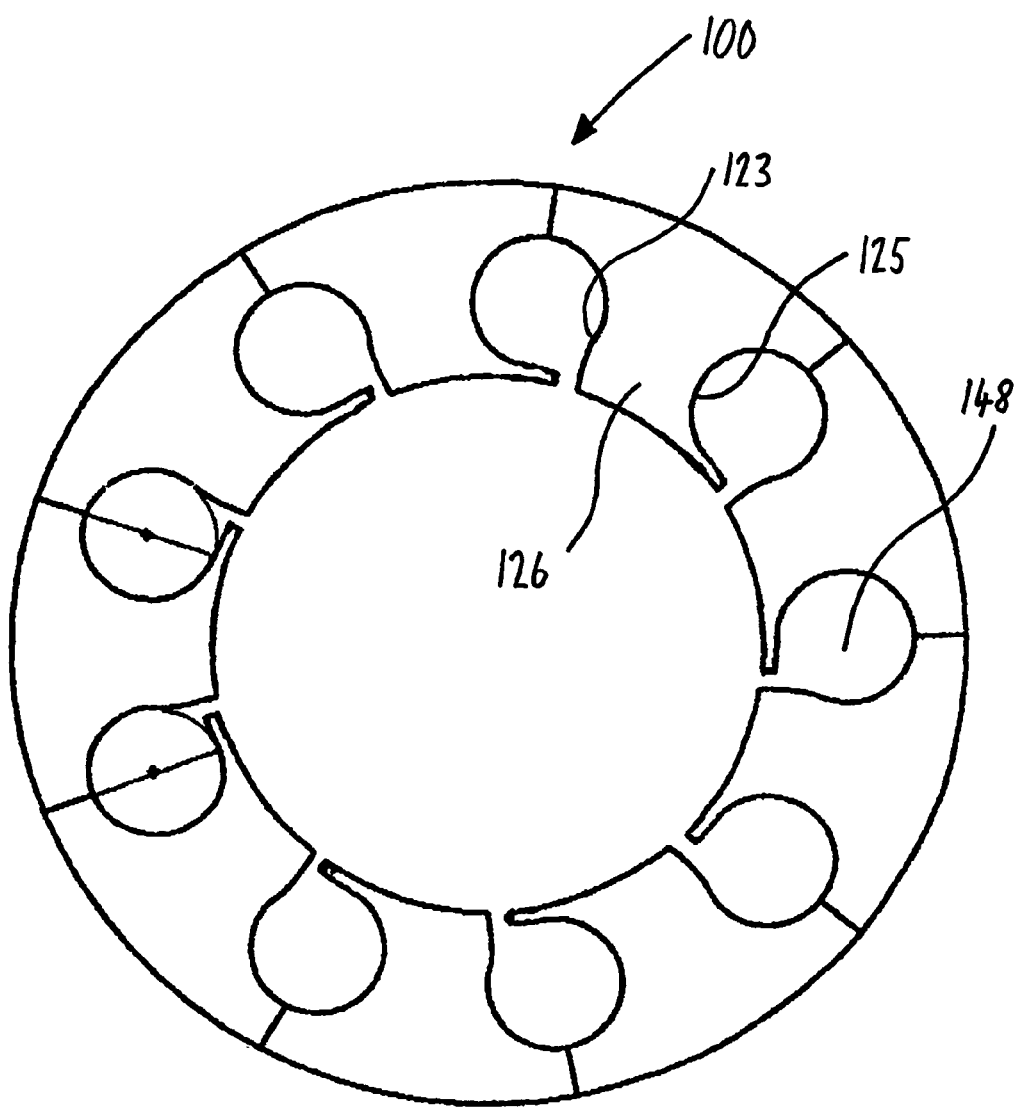
FIG. 6 is a plan view of an alternative stator in which the invention is embodied.

FIG. 6 shows a similar, but alternative stator 100. Pole pieces 126 of the alternative stator 100 also have arcuate sides 123,125. However, the arcs are of smaller diameter. This leads to each cavity 148 having a substantially circular cross-section, which in turn allows each coil portion fitted therein to be substantially semi-circular in cross section. Coil portions of the same coil may therefore be symmetrical and be more convenient to manufacture.

The invention claimed is:

1. A component for forming into an annular stator core of an electrical machine, the component being a plurality of core segments interconnected to form a strip, each core segment including a substantially arcuate base portion which has a convex side, a concave side and a pair of ends and a pole piece which projects from the concave side and from between the ends of the base portion, at least one of the ends of each core segment being connected to an end of an end of an adjacent core segment and each pole piece having a tip that forms an arcuate surface,
wherein each pole piece is adapted to receive at least one coil thereon and said strip of core segments is adapted to be formed, subsequent to receiving at least one coil on a respective one of the pole pieces, into an annular stator core, wherein the arcuate surfaces formed by the pole pieces are substantially concentric, wherein each pole piece projects from the concave side of the base portion in a non-radial direction and is arranged such that a semi-closed slot is formed between it and an adjacent one of the pole pieces whereby, when said at least one coil is fitted onto the respective pole piece and said strip of core segments is formed into the annular stator core, said at least one coil is located between the respective pole piece and the adjacent pole piece,
characterized by sides of each pole piece being arcuate, at least for the length of each pole piece along which the respective coil is moved during fitting.

2. A component according to claim 1 wherein each pole piece projects in a direction that is substantially oblique to a radius therethrough.

3. A component according to claim 2, wherein the perpendicular distance between sides of each pole piece is the same or smaller towards the respective tip than towards the respective base portion, thereby allowing a coil to be moved over the tip of tile pole piece and to be fitted in position around the respective pole piece.

4. A component according to claim 3, wherein inner surfaces of the coil are in mating contact with the sides of the respective pole piece, when the pole piece is fitted thereon.

5. A component according to claim 4, wherein the perpendicular distance between the sides of each pole piece is constant at least for the length of each pole piece along which the respective coil is moved during fitting.

6. A component according to claim 5 wherein, the sides of each pole piece are concentric arcs, at least for the length of each pole piece along which the respective coil is moved during fitting.

7. A component according to claim 6 wherein the arcuate sides curve away from a radius through a root of the respective pole piece, the root being adjacent the respective base portion.

8. A method of manufacturing a stator for an electrical machine, the method including the steps of:
   a) selecting a plurality of core segments which arc interconnected to form a strip, each core segment including a substantially arcuate base portion which has a convex side, a concave side and a pair of ends and a pole piece which projects from the concave side and from between the ends of the base portion, at least one of the ends of each core segment being connected to an end of an adjacent core segment and each pole piece having a tip which forms an arcuate surface;
   b) fitting at least one pre-wound coil to each of the respective pole pieces; and
   c) forming said strip of core segments with said at least one core fitted thereon into an annular stator such that the arcuate surfaces at the pole piece tips are substantially concentric,
wherein each pole projects from the concave side of the substantially arcuate base portion in a non-radial direction and a semi-closed slot is formed between it and an adjacent one of the pole pieces whereby said at least one coil is located between the respective pole piece and the adjacent pole piece,
   characterized by sides of each pole piece being arcuate, at least for the length of each pole piece along which the respective coil is moved during fitting.

9. A method according to claim 8 further comprising providing each pole piece such that each pole piece projects in a direction that is substantially oblique to a radius therethrough.

10. A method according to claim 9, further comprising providing each pole piece such that the perpendicular distance between sides of each pole piece is the same or smaller towards the respective tip than towards the respective base portion, thereby allowing a coil to be moved over the tip of the pole piece and to be fitted in position around the respective pole piece.

11. A method according to claim 10, further comprising providing each pole piece such that inner surfaces of the coil are in mating contact with the sides of the respective pole piece, when the pole piece is fitted thereon.

12. A method according to claim 11, further comprising providing each pole piece such that the perpendicular distance between the sides of each pole piece is constant at least for the length of each pole piece along which the respective coil is moved during fitting.

13. A method according to claim 12, further comprising providing each pole piece such that the sides of each pole piece are concentric arcs, at least for the length of each pole piece along which the respective coil is moved during fitting.

14. A method according to claim 13 further comprising providing each pole piece such that the arcuate sides curve away from a radius through a root of the respective pole piece, the root being adjacent the respective base portion.

* * * * *